(12) United States Patent
Essig et al.

(10) Patent No.: US 7,506,917 B2
(45) Date of Patent: Mar. 24, 2009

(54) CLAMPING ARRANGEMENT FOR A SOFT TOP HEADER FOR A SPORT UTILITY OR OTHER VEHICLE

(75) Inventors: Richard C. Essig, Berthoud, CO (US); Christopher R. Schumacher, Frederick, CO (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 11/688,010

(22) Filed: Mar. 19, 2007

(65) Prior Publication Data
US 2008/0231073 A1 Sep. 25, 2008

(51) Int. Cl.
*B60J 7/11* (2006.01)
*B60J 7/185* (2006.01)
(52) U.S. Cl. .................. 296/121; 296/219; 296/224
(58) Field of Classification Search .......... 296/121, 296/219, 224
See application file for complete search history.

(56) References Cited

U.S. PATENT DOCUMENTS

| | | | |
|---|---|---|---|
| 2,382,635 A * | 8/1945 | Humer | 296/120.1 |
| 3,666,317 A * | 5/1972 | Podwys | 296/116 |
| 4,220,368 A | 9/1980 | Ferrigan | |
| 5,435,615 A | 7/1995 | Schmitz | |
| 5,947,546 A | 9/1999 | Hilliard et al. | |
| 6,520,560 B2 | 2/2003 | Schutt et al. | |
| 6,932,423 B2 | 8/2005 | Stevens et al. | |
| 7,008,011 B2 | 3/2006 | Gevay | |
| 2002/0014781 A1 | 2/2002 | Essig et al. | |
| 2003/0168880 A1 | 9/2003 | Burkel et al. | |

* cited by examiner

*Primary Examiner*—Dennis H Pedder
(74) *Attorney, Agent, or Firm*—W. Scott Carson (57) ABSTRACT

A clamping arrangement for removably securing an elongated header for a vehicle soft top to the windshield frame of a sport utility or other vehicle. The arrangement includes first and second clamp sections. The first section is fixedly attached to the header and the second section is pivotally mounted or otherwise movable relative to the first. The first clamp section includes a downwardly open hook portion that is positionable over a catch member of a footman loop mounted to the main body of the windshield frame. In operation of the preferred embodiment, the second clamp section engages the main body of the windshield wherein the first section and attached header are then rotated forwardly about the axis of the catch member. This forces or drives the header downwardly against the sealing cap on the top of the windshield frame where it is then secured in place.

14 Claims, 8 Drawing Sheets

CLAMPING ARRANGEMENT FOR A SOFT TOP HEADER FOR A SPORT UTILITY OR OTHER VEHICLE

BACKGROUND OF THE INVENTION

1. Field of the Invention

This invention relates to the field of clamping arrangements for removably securing headers to the windshield frames of sport utility and other vehicles and more particularly to the field of such clamping arrangements for headers of frameless soft tops.

2. Discussion of the Background

Headers are widely used to removably attach tops including soft tops to the windshield frames of sport utility and other vehicles. In most cases, the header is removably secured to the windshield frame by manually operated clamps or latches. A very common way of doing so involves providing a protruding loop member on the windshield frame and hooking an arm of the clamp under the loop member. The base of the clamp is fixed to the header and as the clamp is closed, the header is drawn downwardly into engagement with the top of the windshield frame. In other arrangements such as in U.S. Pat. No. 6,932,423 at its FIGS. 6 and 7, the arm of the clamp is hooked under an edge of a recess in the windshield frame rather than under a protruding loop member. However, the basic operation is otherwise essentially the same.

In both such arrangements, the closing action of the clamp draws the header downwardly into engagement with the top of the windshield frame also creates an undesirable rearward rotational force on the header. This rotational force tends to rock or pivot the header rearwardly on the windshield frame, reducing the effectiveness of the weather seal between them. In some cases, the rotational force may actually lift and separate the front of the header from the windshield frame creating a gap into which dust, water, and other elements may penetrate and collect. In addition to these sealing problems, the esthetic look or lines between the header and windshield frame may also be detrimentally affected giving the impression the members are poorly designed or misfit. Further, with soft tops in particular, the fabric of the top may then be looser than desired detracting from the top's overall neat and taut appearance and causing the soft top to flap or otherwise create wind noise.

The most pronounced problems caused by such prior art clamps and the rearward rotational forces on the header they create are with frameless soft tops. That is, if the soft top has an underlying frame, the frame is normally affixed to the header and pivotally or otherwise mounted to the body of the vehicle. Such mountings to the vehicle body are typically more than strong enough to counter any rearward rotational force on the header by the manual clamps. The header engagement with the top of the windshield frame is then nearly ideal with a strong weather seal and a trim fit. However, with frameless soft tops, the rearward rotational forces created by conventional clamping arrangements remain a problem.

With these and other drawbacks in mind, the present invention was developed. In it, a clamping arrangement is provided that creates a forward rather than a rearward rotational force on the header. The forward rotational force then actually enhances the weather seal and fit between the header and the windshield frame. This is advantageous for all soft tops whether or not they have a frame. However, it is particularly desirable for frameless soft tops to help maintain the seal of their header against the windshield frame and their overall clean and taut appearance.

SUMMARY OF THE INVENTION

This invention involves a clamping arrangement for removably securing an elongated header for a vehicle soft top to the windshield frame of a sport utility or other vehicle. The arrangement includes first and second clamp sections. The first section is fixedly attached to the header and the second section is pivotally mounted or otherwise movable relative to the first. The first clamp section includes a downwardly open hook portion that is positionable over a catch member of a footman loop mounted to the main body of the windshield frame. The catch member is spaced from the main body of the windshield frame and preferably extends along a substantially horizontal axis.

In operation of the preferred embodiment and with the catch member received in the downwardly open hook portion and the hook portion extending over both the catch member and its axis, the second clamp section is manipulated to engage the main body of the windshield frame. This movement of the second clamp section in the preferred embodiment is in a first rotational direction (e.g., clockwise) generally about the axis of the catch member. Once the second clamp section engages the windshield frame, further closing of the arrangement will rotate the first clamp section and attached header in an opposite direction (e.g., counterclockwise) about the axis of the catch member. This will force or drive the header downwardly against the sealing cap on the top of the windshield frame where it will be secured in place.

In this manner, a forward torque or rotational force is created by the clamping arrangement on the header that presses or biases the header against the windshield frame and its sealing cap. This forward rotational force actually enhances the seal between the header and windshield frame. It also helps to align the header on the windshield as intended for a trim fit as well as giving the attached soft top the desired neat and taut appearance.

DETAILED DESCRIPTION OF THE INVENTION

Figure 1:
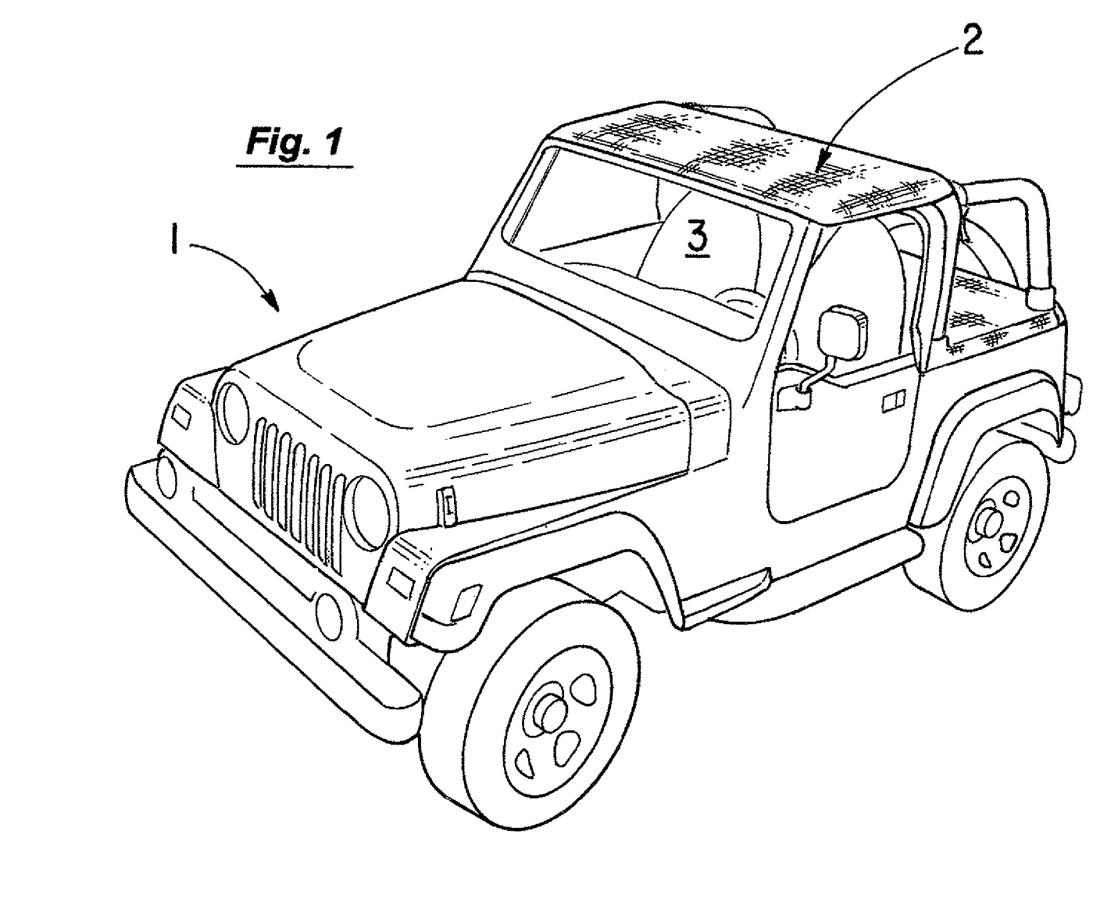
FIG. 1 is a perspective view of a sport utility vehicle with a soft top according to the present invention covering the cabin area.
Figure 2:
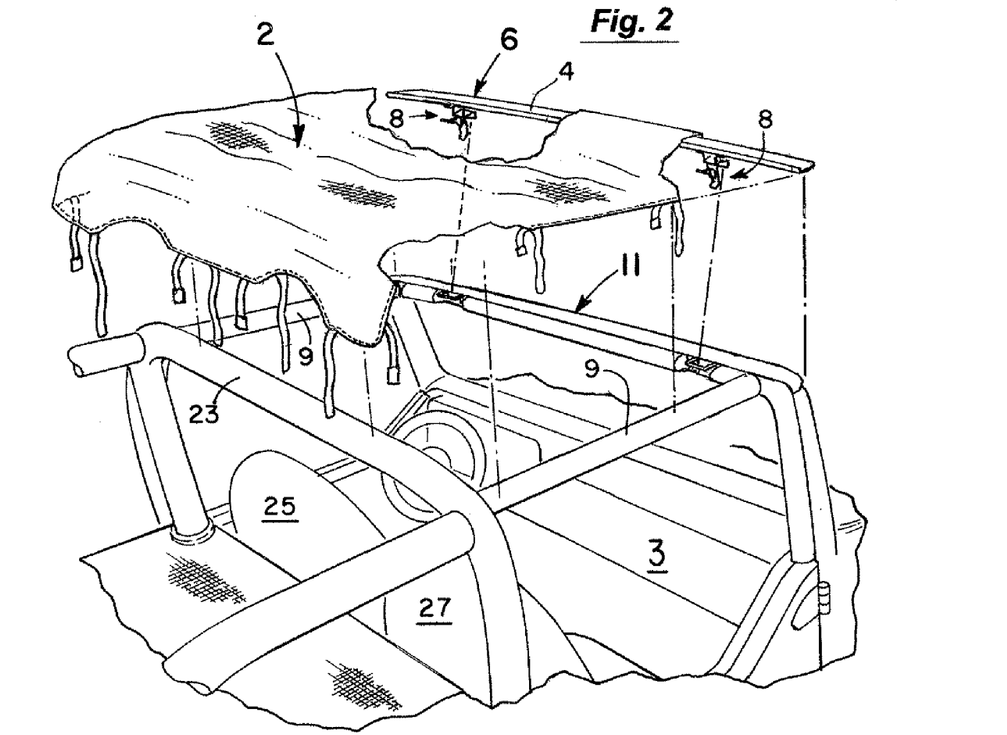
FIG. 2 is an exploded view of the soft top and vehicle of FIG. 1.
Figure 3:
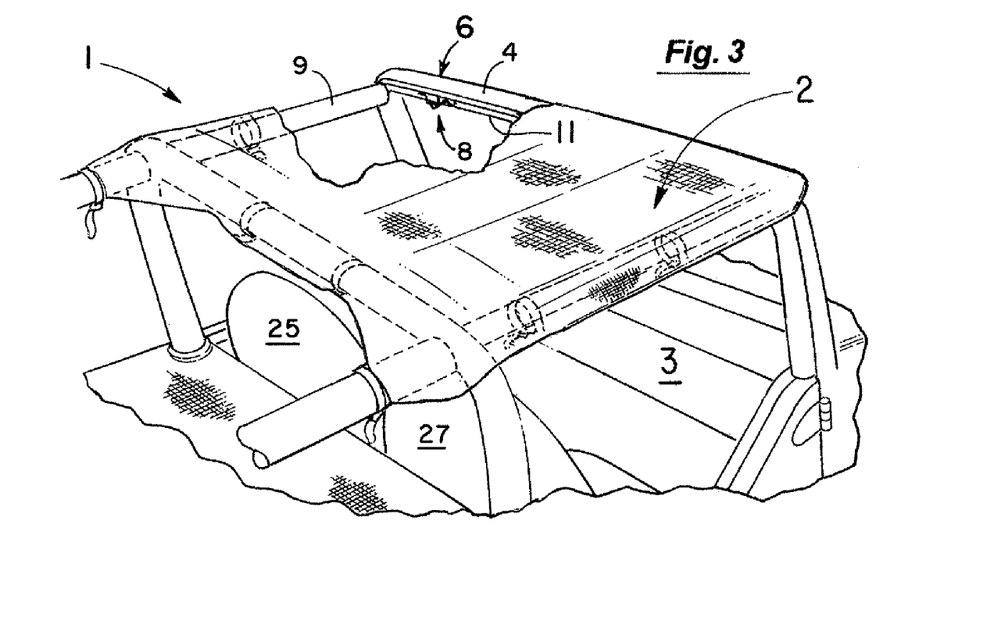
FIG. 3 is a view similar to FIG. 2 with the soft top shown in its secured position on the vehicle.

FIG. 1 illustrates a vehicle 1 with a soft top 2 according to the present invention secured to the vehicle 1 over the cabin area 3. In use, the soft top 2 can be easily and quickly removed (FIG. 2) or attached (FIG. 3) in place above the cabin area 3. In the position of FIG. 3, the illustrated soft top 2 extends from side-to-side between the members 9 of the safety bar arrangement of FIG. 2 and from front-to-back between the windshield frame 11 and the member 23 of the safety bar arrangement. The member 23 in this regard is immediately behind the driver's and passenger's seats 25 and 27. In mounting the soft top 2 on the vehicle 1 as seen in FIGS. 2 and 3, the main body 4 of the elongated header 6 attached to the soft top 2 is releasably secured by clamping arrangements 8 to the windshield frame 11 of the vehicle 1.

Figure 4:
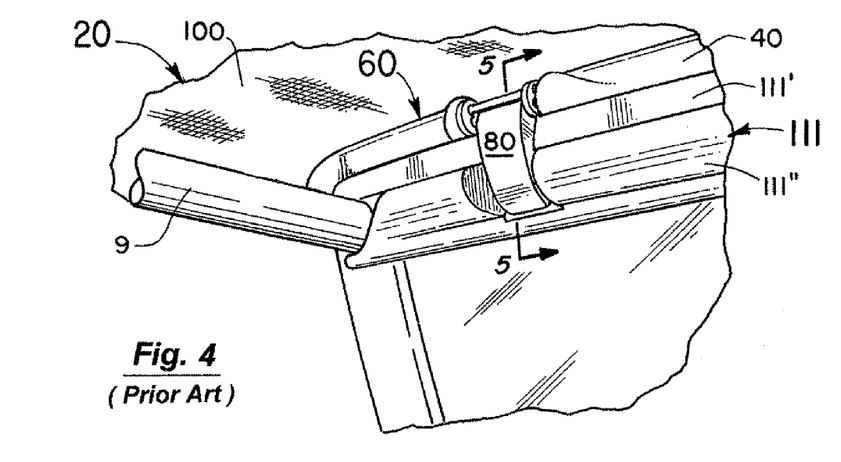
FIG. 4 is a view essentially from the driver's seat looking up at the front left corner of the vehicle showing a prior art clamping arrangement used to secure a soft top header to the vehicle windshield.
Figures 5, 6:
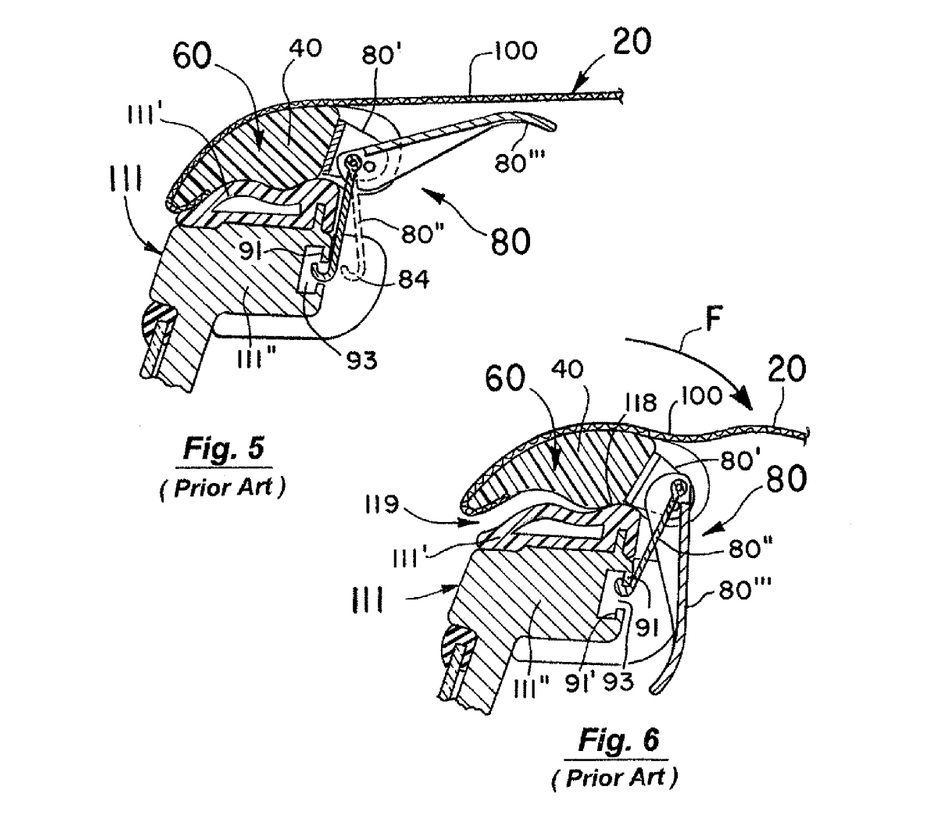
FIG. 5 is a view taken along line 5-5 of FIG. 4 but showing the prior art clamp in its open position initially engaging the windshield.
FIG. 6 is a view similar to FIG. 5 showing the undesirable rearward rotation of the header relative to the vehicle windshield that can occur due to the operation of the prior art clamp.

In prior art approaches such as the one illustrated in FIGS. 4-6, the soft top header 60 to which the fabric 100 (e.g., canvas, vinyl) of the top 20 is attached (e.g., by screws, snaps, or adhesives) is commonly secured to the windshield frame 111 by clamping arrangements such as 80. The prior art clamping arrangement 80 as shown essentially has a first clamp section 80', (FIG. 5) fixedly attached to the header 60 and a second clamp section 80" pivotally mounted to the first clamp section 80'. In operation, the second clamp section or arm 80" is hooked at 84 under the upper edge 91 of the recess 93 in the windshield frame 111. The clamp handle 80''' is then manipulated to the lowered position of FIG. 6 to close the clamping arrangement 80 and bring the header 60 into tight engagement with the windshield frame 111 at its seal 111'. In doing so, an undesirable rearward rotational problem can occur as illustrated in FIG. 6.

More specifically, this illustrated problem of FIG. 6 can develop because the clamp assemblies 80 used to releasably secure the header 60 to the vehicle windshield 111 create a rearward torque or rotational force F (see FIG. 6). The rearward rotational force F in turn tends to lift or rotate the main body 40 of the header 60 relative to the windshield 111 and its seal 111'. This rotation is generally about an axis or location 118 (see FIG. 6) and not only can compromise the seal between the main body 40 of the header 60 and the windshield sealing cap 111' but also may even cause a distinct separation or crack to appear such as 119 in FIG. 6.

The resulting drawbacks of such rearward rotation (even if only slight) can be quite significant from both an appearance standpoint and a structural one. As for example, the rotation tends to create an undesirable dip and looseness in the fabric portion 100 of the top 20 (FIG. 6). This can greatly detract from the desired neat and taut appearance of the top 20. Additionally, this looseness or slack can cause the fabric 100 to flutter when the vehicle 1 is driven creating undesirable cabin noise. Structurally, as previously mentioned, the rotation of the header 60 in FIG. 6 can compromise the normal seal between the main body 40 of the header 60 and the sealing cap 111' of the windshield 111. This in turn can allow water, dust, and air to actually enter the cabin onto the occupants in the vehicle 1 as well as create whistling noises when the vehicle 1 is driven.

Figure 7:
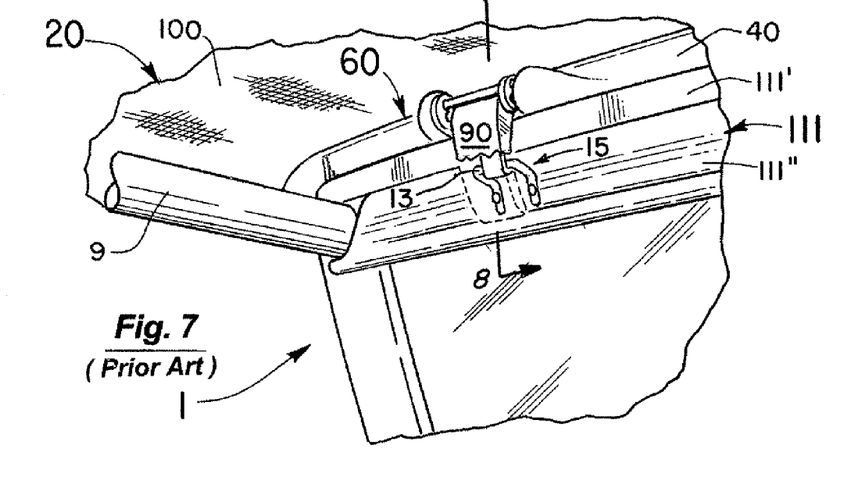
FIGS. 7-9 illustrate another prior art clamping arrangement in views similar to FIGS. 4-6.
Figures 8, 9:
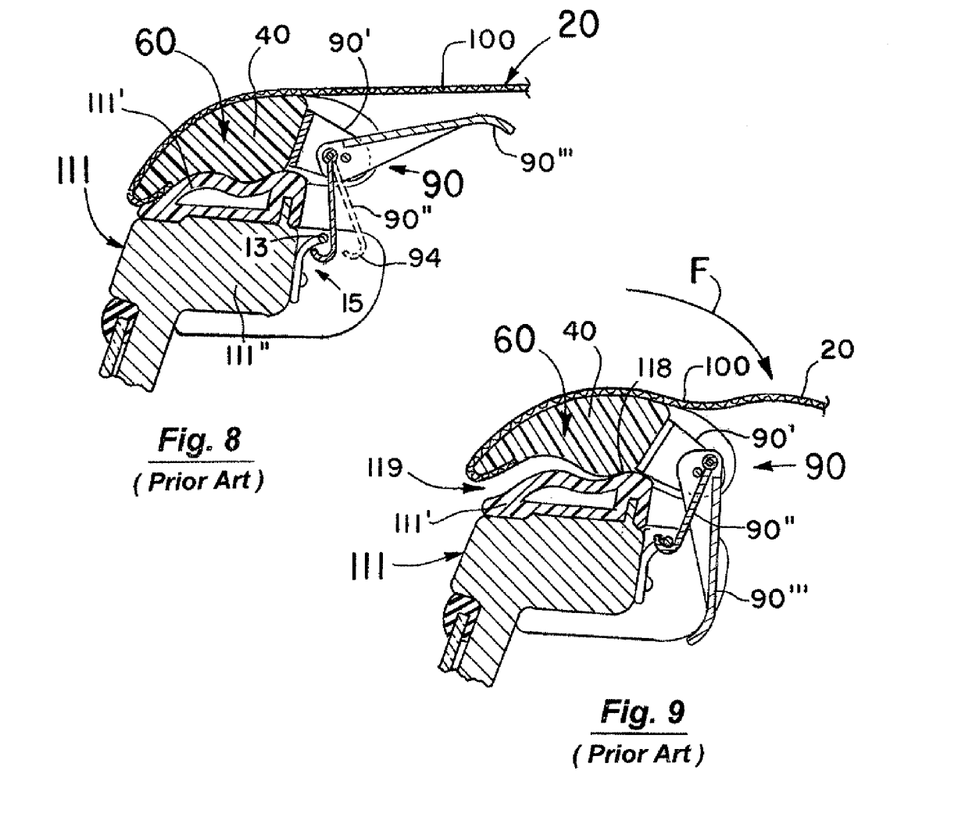

The same rearward rotation problem occurs in other prior art clamping arrangements such as 90 in FIGS. 7-9. In contrast to the prior art arrangement 80 of FIGS. 4-6, the prior art clamping arrangement 90 of FIGS. 7-9 hooks its clamp arm 90' at 94 (FIG. 8) under a catch member 13 of the footman loop 15 (see also FIG. 7). The footman loop 15 as shown protrudes from the main body 111" of the windshield 111. Otherwise, the prior art clamping arrangement 90 operates essentially in the same manner as the arrangement 80 of FIGS. 4-6, including creating the undesirable rearward torque or rotational force F tending to rock or lift the header 60 as in FIG. 9.

To overcome these problems, the clamping arrangement 8 of the present invention was developed. In it as illustrated in FIGS. 10-14, a clamping arrangement 8 is provided that creates a forward rotational force F' (FIGS. 13 and 14) on the header 6 rather than a rearward one as in the prior art approaches. The forward rotational force F' then actually enhances the weather seal and fit of FIG. 14 between the header 6 at its main body 4 and the windshield frame 11 at its sealing member 11'. As discussed above, this design is particularly advantageous for frameless soft tops and other tops that do not have a stiff frame or other structure to counter the rearward rotational force created by the prior art clamps.

Figure 10:
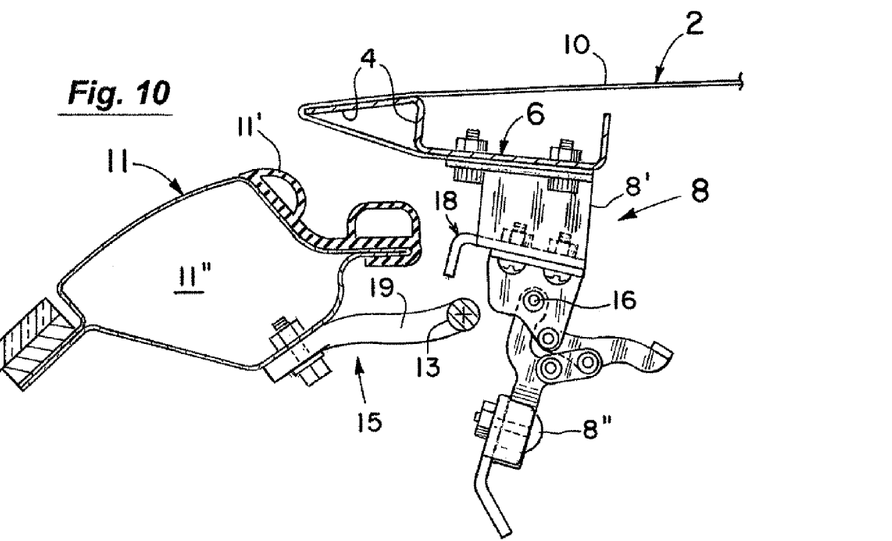
FIGS. 10-14 sequentially illustrate how the clamping arrangement of the present invention secures the header to the windshield frame in a manner that creates a forward rotational force on the header rather than a rearward one as in the prior art approaches of FIGS. 4-9.
Figure 11:
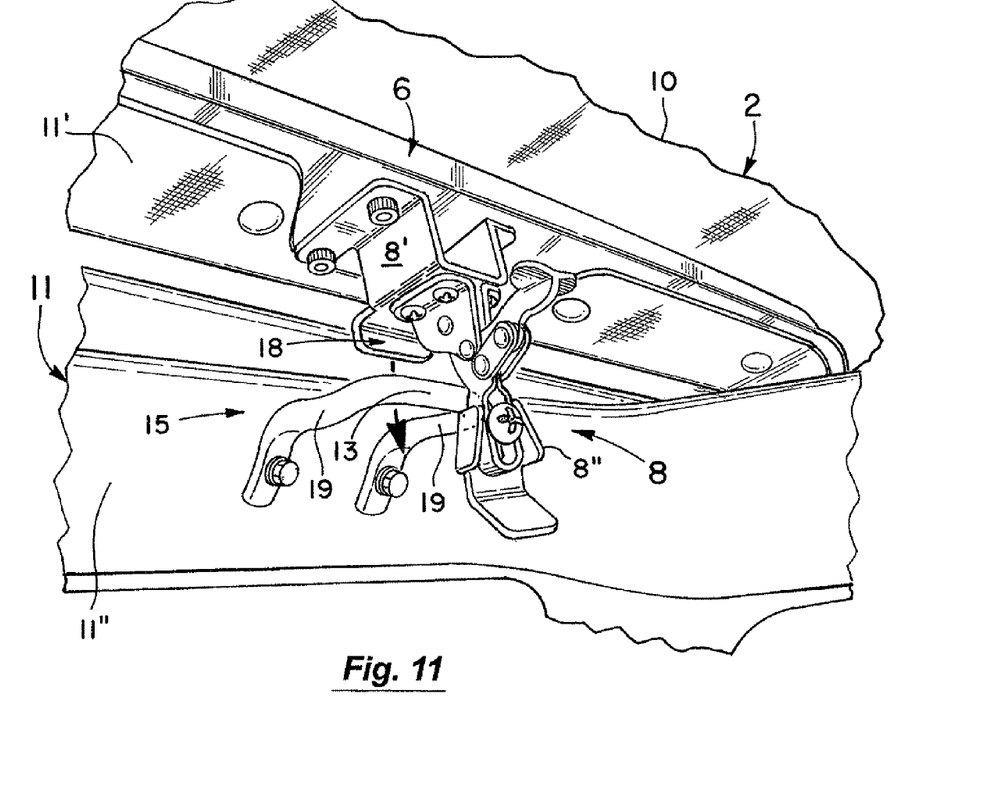
Figure 14:
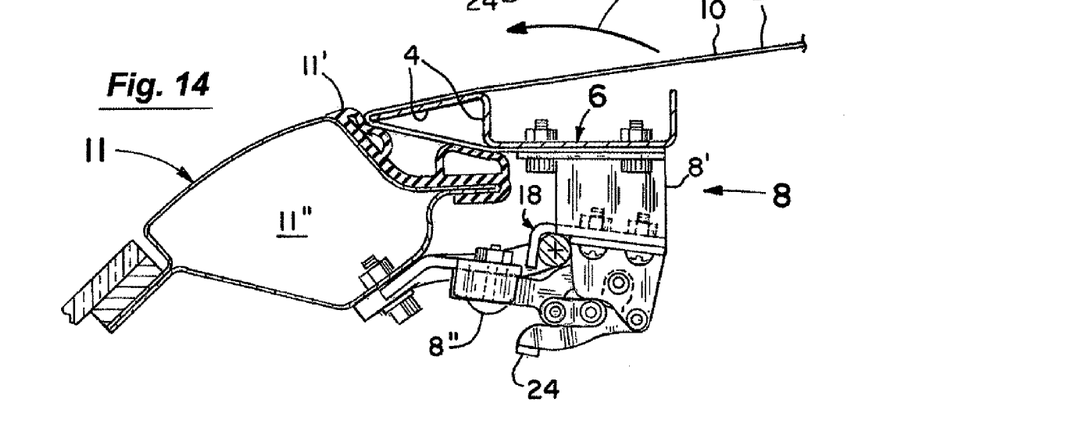
Figure 15:
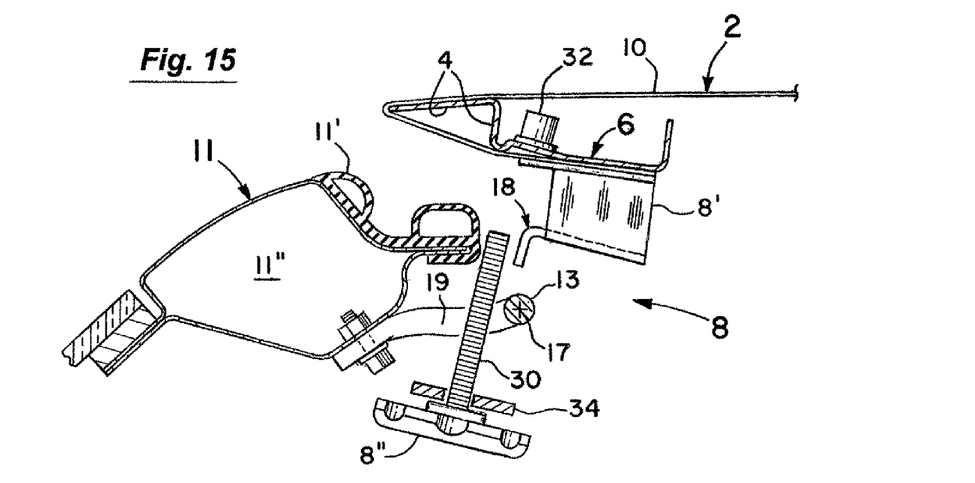
FIGS. 15-18 sequentially illustrate a second embodiment of the clamping arrangement of the present invention that also creates a forward rotational force on the header rather than a rearward one as in the prior art approaches of FIGS. 4-9.
Figure 16:
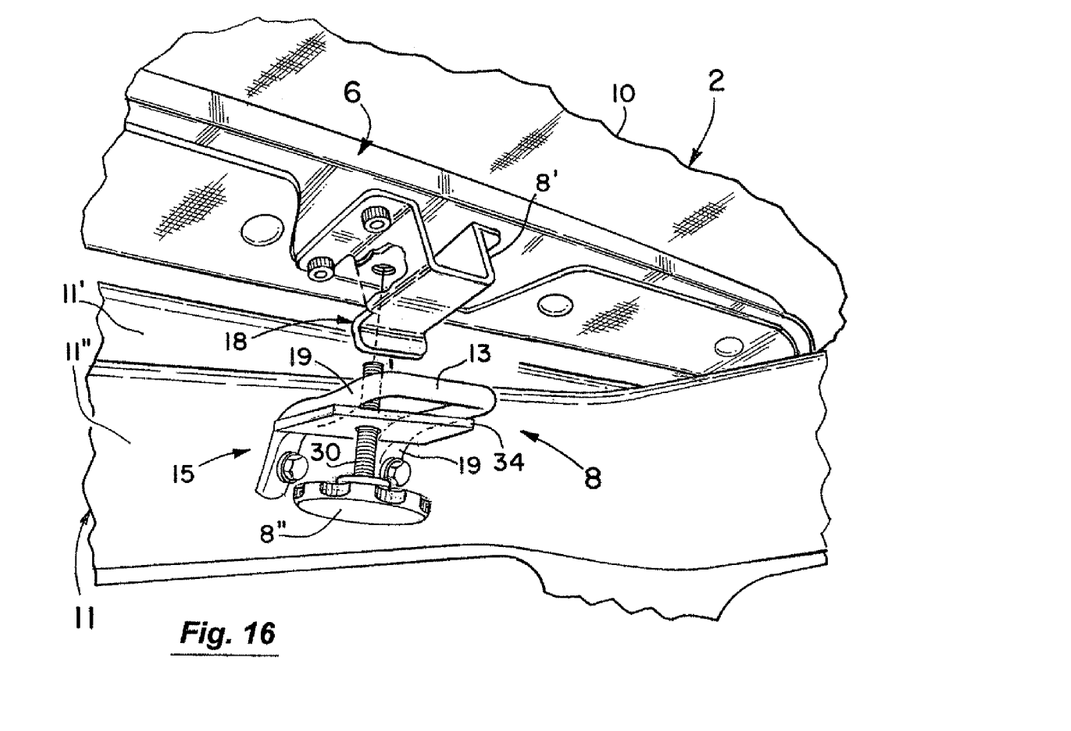

More specifically as illustrated in FIGS. 10 and 11, the clamping arrangement 8 of the present invention has a first clamp section 8' fixedly attached to the header 6 and a second clamp section 8". The second clamp section 8" as shown in FIG. 10 is mounted at 16 to the first clamp section 8' for pivotal movement relative thereto between the open position of FIG. 10 and the closed position of FIG. 14. The first clamp section 8' (FIG. 10) has a downwardly open hook portion 18. The hook portion 18 as shown is spaced from the main body 4 of the header 6 that engages the windshield frame 11 including its seal 11' (FIG. 14).

Figure 12:
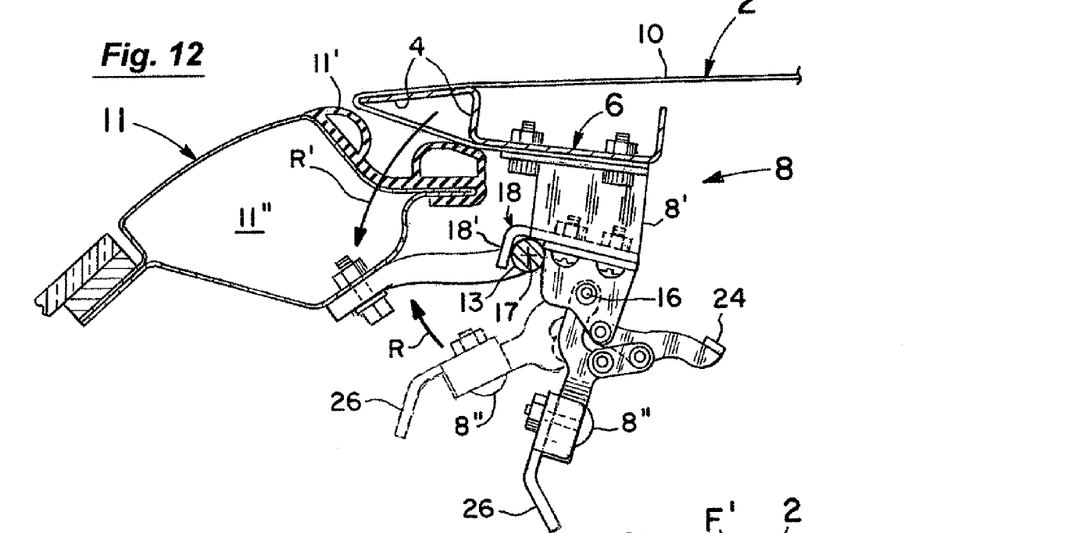

In operation, the header 6 is first manually manipulated from the position of FIGS. 10 and 11 to the position of FIG. 12. In the position of FIG. 12, the downwardly open hook portion 18 extends over the catch member 13 of the footman loop 15 that protrudes from the main body 11", of the windshield frame 11. The catch member 13 is then received (FIG. 12) in the downwardly open hook portion 18 with the header portion 4 adjacent the windshield frame 11. The catch member 13 establishes the substantially horizontal pivotal axis 17 and is preferably an elongated bar extending along the axis 17. The pivotal axis 17 is fixed relative to the windshield frame 11 and in the position of FIG. 12, the hook portion 18 extends over both the catch member 13 and the axis 17. The part 18' of the hook portion 18 as in FIG. 12 is also positioned between the catch member 13 and the main body 11" of the windshield frame 11. In this manner, the hook portion 18 essentially straddles the catch member 13 in the illustrated embodiment.

Figure 13:
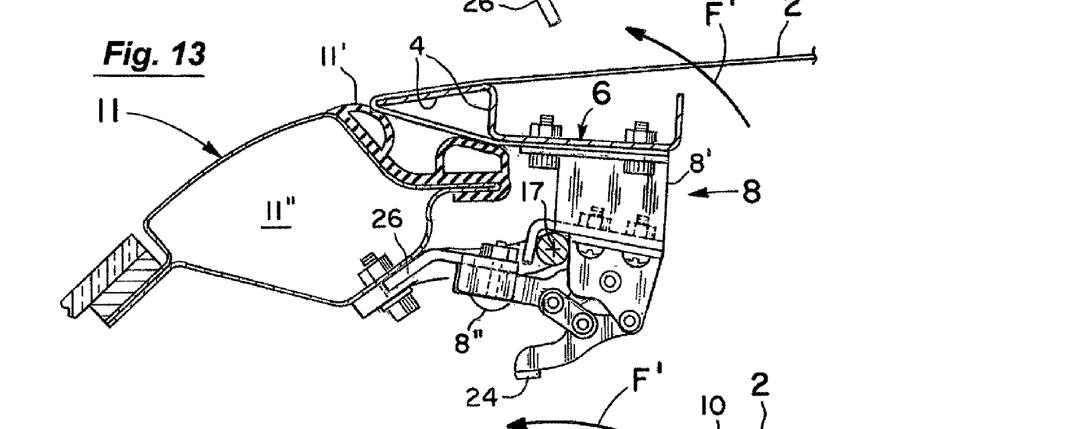

The clamp lever 24 can then be manipulated to move or drive the second clamp section 81" generally about the axis 17 (FIG. 12) to engage the brace member 26 of the second clamp section 81" with the windshield frame 11 (FIG. 13). In doing so, the second clamp section 8" is moved or driven as shown in a rotational direction R (e.g., clockwise in the orientation of FIGS. 12 and 13) about the pivotal axis 16 of the clamp 8 to engage the windshield frame 11. This pivotal movement of the second clamp section 8" is also generally about the pivotal axis 17 of the catch member 13. In turn, the header 6 is forced or driven in an opposite rotational direction R' (counterclockwise in FIGS. 12 and 13) about the axis 17 of the catch member 13 toward the brace member 26 to engage the header portion 4 with the windshield frame 11 (FIG. 13). The clamp lever 24 can then be further moved to its overcenter position of FIG. 14 to secure the header 6 to the windshield 11 in a fixed relationship. In this fixed or secured position, the header portion 4 is engaged and pressed or biased under a force F' against the windshield frame 11 including its seal 11' and main body 11".

It is noted that the fabric 10 of the soft top 2 can be wrapped about the header portion 4 as illustrated or not so wrapped and the windshield frame 11 can be provided with any number of designs of sealing caps at 11' or none at all. The header portion 4 may then engage the main body 11" of the windshield 11 directly in the sense of an abutting relationship or engage in a manner with other structure such as the fabric top 10 or seal 11' pressed or pinched therebetween as in FIGS. 12-14. The hooking of the first clamp section 8' has also been illustrated in FIGS. 10-14 as being over an elongated catch or bar member 13 of a footman loop 15. However, it could also hook over the lower edge or catch member 91' of a recess such as 93 in the windshield frame 111 of FIG. 6 or other catch structure including a more circular loop (e.g., eyebolt). Additionally, the soft top 2 could have other designs than those illustrated covering all or other portions of the vehicle 1. Further, the clamping arrangement of the present invention as discussed above has particular value for frameless soft tops that are essentially or predominately attached to the windshield frame by the clamps 8. However, the invention also has desirable applications to soft tops with frames and other tops or accessories attachable to the windshield frame to reduce or eliminate the undesirable rearward torque created by prior art approaches.

Figure 17:
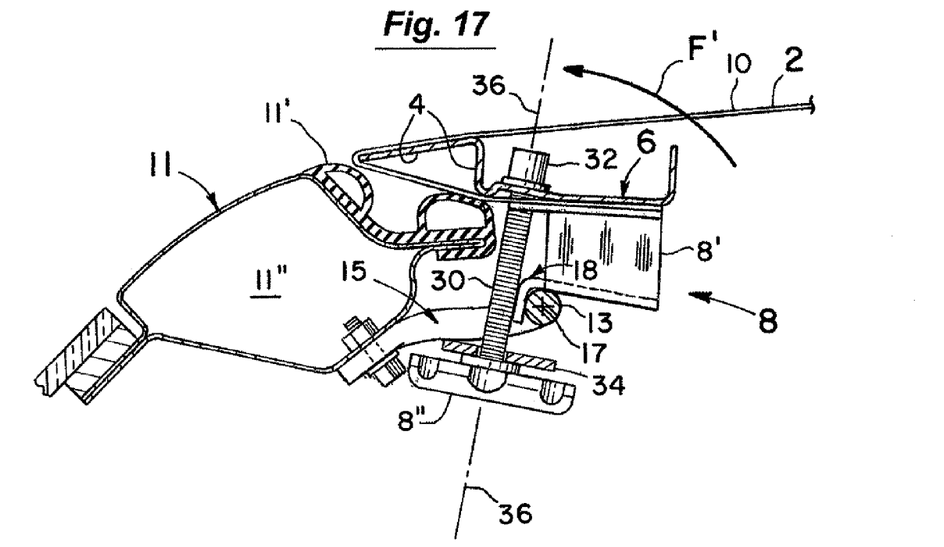
Figure 18:
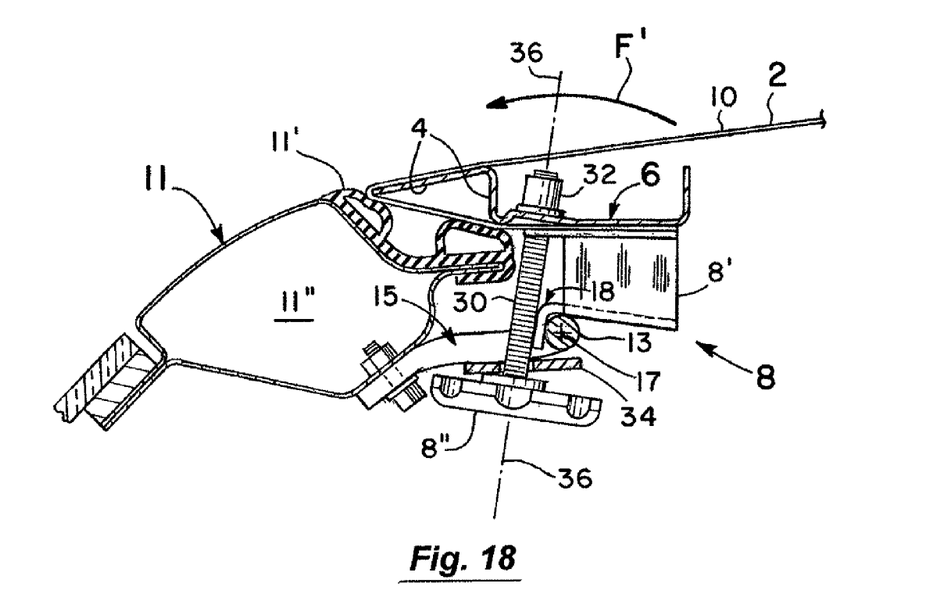

FIGS. 15-18 illustrate a second embodiment of the present invention in which the first clamp section 8' is still hooked at 18 over the catch or bar member 13 (FIGS. 17 and 18). However, the second clamp section 8" of this embodiment can be physically separable as in FIG. 15 from the first clamp section 8' if desired. In operation, the threaded bolt 30 of the second clamp section 8" can be passed between the legs 19 of the footman loop 15 (see FIGS. 15 and 16) into the threaded nut 32 on the header 6 (FIG. 17). Tightening of the bolt 30 will then engage the plate 34 against the footman loop 15 forcing or drawing the header 6 along the axis 36 toward the second clamp section 8". This action as in the first embodiment will create a forward rotational force F' (FIG. 17) driving or causing the header 6 and first clamp section 8' affixed thereto to rotate about the catch member 13 and axis 17 to engage the header portion 4 and windshield 11. Further tightening of the bolt 30 to the position of FIG. 18 will then secure the header portion 4 in a fixed relationship. In this fixed or secured position as in the first embodiment, the header portion 4 is engaged and pressed or biased under a force F' against the windshield frame 11 including its seal 11' and main body 11".

The bolt 30 in this second embodiment could be off to one side of the footman loop 15 if desired. Either way, it will still create the rotation and forward force F' on the header 6 as the header portion 4 is forced or drawn along the axis 36 of the bolt 30 to engage the windshield frame 11. The bolt axis 36 in this regard as illustrated in FIGS. 17 and 18 is spaced from and substantially perpendicular to the pivotal axis 17. The axis 36 is also forward of the axis 17 of the catch member 13 and substantially between the pivotal axis 17 and the windshield frame 11.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A clamping arrangement for removably securing an elongated header for a soft top to a windshield frame of a vehicle, said windshield frame having a main body and a catch member establishing a substantially horizontal axis, said clamping arrangement including:

a first clamp section fixedly attached to said elongated header and a second clamp section mounted to said first clamp section for movement relative thereto between open and closed positions, said elongated header with said second clamp section in said closed position having a portion thereof sealingly engaging the main body of the windshield frame at a first location, said first clamp section having a downwardly open hook portion spaced from the portion of the elongated header engagable with the main body of the windshield frame, said catch member of said windshield frame being received in said downwardly open hook portion with said hook portion extending over said catch member and over said horizontal axis with said header portion adjacent the main body of said windshield frame, and said second clamp section including a brace member selectively engagable with the windshield frame with the catch member of said windshield frame received in said downwardly open hook portion, said brace member engaging said windshield frame substantially below the first location and forward of the horizontal axis as said second clamp section including said brace member is moved in a first direction toward the closed position of said second clamp section to rotate the elongated header about the horizontal axis established by the catch member in a second direction toward said brace member to engage said portion of the elongated header with said main body of the windshield frame, said second clamp section in said closed position securing said elongated header to said windshield frame in a fixed position relative thereto with said portion of the elongated header engaging the main body of said windshield frame.

2. The clamping arrangement of claim 1 wherein said catch member is spaced from the main body of said windshield frame with part of said downwardly open hook portion of said first clamp section positioned between said catch member and the main body of said windshield frame with said catch member received in said downwardly open hook portion.

3. The clamping arrangement of claim 2 wherein said catch member includes an elongated bar extending substantially along said horizontal axis.

4. The clamping arrangement of claim 1 wherein said catch member includes an elongated bar extending substantially along said horizontal axis, said elongated bar being received in said downwardly open hook portion.

5. The clamping arrangement of claim 1 wherein the first direction of movement of the brace member as said second clamp section is moved toward the closed position of said second clamp section is in a rotational direction substantially opposite to the rotational direction of the elongated header.

6. The clamping arrangement of claim 1 wherein said first and second clamp sections are pivotally mounted to each other.

7. The clamping arrangement of claim 1 wherein the first direction of movement of the brace member as said second clamp section is moved toward the closed position is along an axis spaced from and substantially perpendicular to said horizontal axis.

8. The clamping arrangement of claim 1 wherein said brace member is a plate.

9. The clamping arrangement of claim 1 further including a soft top attached to said elongated header.

10. A clamping method for creating a forward rotational force on a portion of an elongated header engagable with a windshield frame of a vehicle to bias said header portion in an engaging relationship against said windshield frame, said clamping method including the steps of:

(a) providing a clamp arrangement with a first clamp section fixedly attached to said elongated header and a second clamp section movable relative to said first clamp section between open and closed positions, (b) establishing a pivotal axis fixed relative to said windshield frame with a catch member, (c) hooking a portion of said first clamp section spaced from said portion of the elongated header engagable with said windshield frame over said catch member and over said pivotal axis to place said first clamp section and said elongated header fixed thereto in a first position about said catch member and said pivotal axis, (d) creating a force to drive said portion of said elongated header toward said second clamp section to rotate said first clamp section and said header fixed thereto about said catch member and said pivotal axis from said first position to a second position with said portion of said elongated header sealingly engaging said windshield frame at a first location, said step (d) further including the limitation wherein the creating of the force includes providing said second clamp section with a brace member and engaging said brace member with said windshield frame substantially below the first location and forward of the pivotal axis of step (b), and (e) securing said first clamp section and elongated header fixed thereto in said second position with the header portion engaged and biased against said windshield frame.

11. The clamping method of claim 10 including the further limitation of pivotally mounting said second clamp section to said first clamp section.

12. The clamping method of claim 10 wherein step (d) includes the further limitation of driving said portion of the elongated header and said second clamp section toward each other in opposite rotational directions about said catch member and said pivotal axis from said first position to said second position.

13. The clamping method of claim 10 wherein step (d) includes the further limitation of driving said second clamp section into an engaging relationship against said windshield frame in said second position.

14. The clamping method of claim 10 wherein step (d) includes the further limitation of moving said brace member along an axis spaced from and substantially perpendicular to the pivotal axis.

* * * * *